(12) United States Patent
Lu et al.

(10) Patent No.: US 12,104,267 B2
(45) Date of Patent: Oct. 1, 2024

(54) FILTERING MECHANISM AND DEVICE FOR PRODUCING CONDUCTIVE MATERIAL

(71) Applicant: CONTEMPORARY AMPEREX TECHNOLOGY CO., LIMITED, Ningde (CN)

(72) Inventors: Yi Lu, Ningde (CN); Xiaosong Liu, Ningde (CN); Keqiang Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 81 days.

(21) Appl. No.: 17/965,158

(22) Filed: Oct. 13, 2022

(65) Prior Publication Data

US 2023/0044748 A1 Feb. 9, 2023

Related U.S. Application Data

(63) Continuation of application No. PCT/CN2021/140949, filed on Dec. 23, 2021.

(30) Foreign Application Priority Data

Mar. 25, 2021 (CN) .......................... 202120611024.6

(51) Int. Cl.
C25D 21/06 (2006.01)
(52) U.S. Cl.
CPC ..................................... *C25D 21/06* (2013.01)
(58) Field of Classification Search
None
See application file for complete search history.

(56) References Cited

U.S. PATENT DOCUMENTS

| 5,776,327 A * | 7/1998 | Botts | C25D 17/12 |
| | | | 204/287 |
| 5,938,899 A * | 8/1999 | Forand | C25D 17/12 |
| | | | 204/288.2 |
| 2007/0227632 A1 | 10/2007 | Schnetz et al. | |

FOREIGN PATENT DOCUMENTS

| CN | 103361708 A | 10/2013 |
| CN | 105780097 A | 7/2016 |
| CN | 205556839 U | 9/2016 |
| CN | 205556840 U | 9/2016 |
| CN | 209636358 U | 11/2019 |

(Continued)

OTHER PUBLICATIONS

International Search Report of Application No. PCT/CN2021/140949 mailed Mar. 23, 2022.

(Continued)

*Primary Examiner* — Louis J Rufo
(74) *Attorney, Agent, or Firm* — Ladas & Parry LLP

(57) ABSTRACT

This application relates to a filtering mechanism and a device for producing a conductive material, where the filtering mechanism includes a filtering body, a cover, and a supporting member. The filtering body includes an accommodating cavity for accommodating an electroplating material and an opening provided on the filtering body; the cover is configured to cover the opening and connect to the filtering body to enclose the electroplating material in the filtering body; and the supporting member is provided on the cover to enhance connection strength between the cover and the filtering body.

7 Claims, 5 Drawing Sheets

(56) References Cited

FOREIGN PATENT DOCUMENTS

| | | |
|---|---|---|
| CN | 211897140 U | 11/2020 |
| CN | 214612819 U | 11/2021 |
| CN | 217709747 U | 11/2022 |
| JP | 04346698 A | 12/1992 |
| JP | 3029750 | 10/1996 |
| JP | 3029750 U | 10/1996 |
| JP | 2018-12862 A | 1/2018 |
| JP | 2018012862 A | 1/2018 |
| KR | 20140076321 A | 6/2014 |

OTHER PUBLICATIONS

Written Opinion of Application No. PCT/IB2022/051502 mailed Mar. 23, 2022.
Notice of Granting Priority Right of Utility Model Patent Right CN202120611024.6 mailed Oct. 8, 2021.
Extended European search report for Application No. 21932775.6, dated Nov. 24, 2023, 8 pages.
Japan Decision of Grant for Application No. 2022-559419, dated Nov. 7, 2023, 3 pages.
OA1 issued on Japanese copending application 2022-559419 dated Jul. 26, 2023.
Granting Notification for Japanese copending application 2022-559419 dated Oct. 27, 2023.
Notice of Reasons for Refusal, dated Aug. 5, 2023, corresponding to JP Application No. 2022-559419.
Granting Notification for on Korean copending application 10-2022-7034409 dated Jul. 1, 2024.

\* cited by examiner

FILTERING MECHANISM AND DEVICE FOR PRODUCING CONDUCTIVE MATERIAL

CROSS-REFERENCE TO RELATED APPLICATIONS

This application is a continuation of International Patent Application No. PCT/CN2021/140949 filed on Dec. 23, 2021 which claims priority to Chinese patent application No. 202120611024.6, filed on Mar. 25, 2021 and entitled "FILTERING MECHANISM AND DEVICE FOR PRODUCING CONDUCTIVE MATERIAL". These applications are incorporated herein by reference in its entirety.

TECHNICAL FIELD

This application relates to the technical field of battery production, and in particular, to a filtering mechanism and a device for producing a conductive material.

BACKGROUND

During production of a conductive material, an electroplating material needs to be electroplated onto a surface of the conductive material. Specifically, soluble metal is electroplated onto the conductive material. However, during electrolysis, the conductive material is often scratched.

SUMMARY

In view of this, a filtering mechanism and a device for producing a conductive material need to be provided to resolve a technical problem that conductive materials are often scratched during electrolysis in the prior art.

To achieve the foregoing objective, the inventors proposed a filtering mechanism for producing a conductive material, where the filtering mechanism includes:
- a filtering body, including an accommodating cavity for accommodating an electroplating material and an opening provided on the filtering body;
- a cover, configured to cover the opening and connect to the filtering body to enclose the electroplating material in the filtering body; and
- a supporting member, provided on the cover to enhance connection strength between the cover and the filtering body.

Different from the prior art, in the technical solutions of this application, the supporting member is provided on the cover to enhance connection strength between the cover and the filtering body. In this way, the cover of the filtering mechanism can be effectively prevented from curling, and the cover can be prevented from scratching the conductive material, thereby improving a production yield rate and production efficiency of conductive materials.

In an embodiment of this application, the opening is located at the top of the filtering body, and the cover includes a top cover and a side cover, the top cover being provided at the top of the filtering body to cover the opening, the side cover being connected to the top cover and provided on a side of the filtering body, and the side cover being provided with the supporting member.

In this way, the top cover covers the opening, the side cover is connected to the top cover, and the side cover is provided with the supporting member; and the side cover can pull the top cover downward in the direction of gravity under an action of gravity of the supporting member, thereby preventing the top cover and the side cover from curling upward and scratching the conductive material.

In an embodiment of this application, a cavity for accommodating the supporting member is provided in the side cover.

In this case, a cavity for accommodating the supporting member is provided in the side cover, and the supporting member can be directly placed in the cavity to facilitate installation and detachment of the supporting member.

In an embodiment of this application, the cover has two opposite ends, one end being movably connected to the filtering body, and the other end being provided with the supporting member.

In this case, to facilitate opening of the cover, one end of the cover is movably connected to the filtering body, and the other end is provided with the supporting member to pull the entire cover downward to effectively prevent the cover from curling.

In an embodiment of this application, the supporting member extends in a length direction of the opening, and the cover is provided with the supporting member in the length direction of the opening.

In this way, the cover is provided with the supporting member in the length direction of the opening to prevent any part of the cover in the length direction of the opening from curling.

In an embodiment of this application, the end of the cover that is provided with the supporting member is connected to the filtering body via a hook-and-loop fastener.

In this way, the cover may be fastened to the filtering body via the hook-and-loop fastener. On the basis of the supporting member, another fastening structure is added, which can further prevent the cover from curling.

In an embodiment of this application, the hook-and-loop fastener includes a hook tape and a loop tape, and the supporting member is provided outside a bonding surface of the hook tape and the loop tape to support the bonding surface, so that connection strength between the hook tape and the loop tape is enhanced.

In this way, the supporting member is provided outside the bonding surface of the hook tape and the loop tape, which can support the bonding surface, improve an overall bonding effect of the hook-and-loop fastener, and ensure tight attachment of the hook-and-loop fastener, high pasting flatness, and even force on the bonding surface, so that the connection strength between the hook tape and the loop tape is enhanced and the cover is not likely to curl.

In an embodiment of this application, the filtering mechanism further includes a fastening assembly, and the side cover is connected to the filtering body via the fastening assembly.

In the way, the fastening assembly is further provided for double insurance. Even if the cover and the filtering body are partially detached, the fastening assembly can still ensure that the cover cannot curl or scratch the conductive material.

In an embodiment of this application, the filtering mechanism further includes a conductive body, the electroplating material is provided in the conductive body, and the filtering body and the cover are configured to cover the conductive body.

In this case, in a process of forming an electroplating layer on the conductive material, the electroplating material needs to be energized. However, directly energizing the electroplating material cannot implement a good energization effect. Therefore, the electroplating material is provided in the conductive body, the conductive body is insoluble metal that is resistant to electricity and corrosion, and the conductive body is energized, so that the electrolysis effect can be effectively improved.

To achieve the foregoing objective, the inventors further proposed a device for producing a conductive material, including the filtering mechanism according to any one of the foregoing embodiments.

Different from the prior art, in the process of producing the conductive material in the technical solutions of this application, the cover of the filtering mechanism can be effectively prevented from curling, and the cover can be prevented from scratching the conductive material, thereby improving a production yield rate and production efficiency of conductive materials.

BRIEF DESCRIPTION OF DRAWINGS

In order to describe the technical solutions in the embodiments of this application more clearly, the following briefly describes the accompanying drawings required for describing the embodiments. It should be understood that, the accompanying drawings below only show some embodiments of this application, and thus should not be considered as a limitation on the scope. Persons of ordinary skill in the art may still derive other related drawings from the accompanying drawings without creative efforts.

Figure 1:
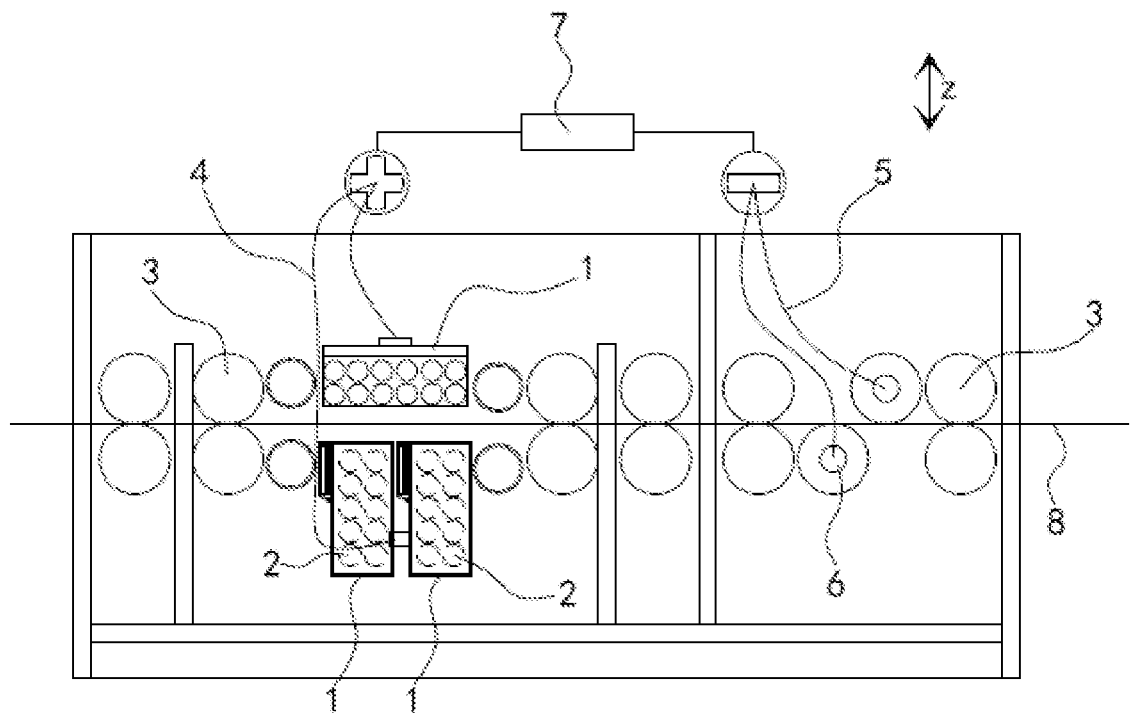
FIG. 1 is a schematic structural diagram of a device for producing a battery according to a specific embodiment.

The accompanying drawings are not drawn to scale.

Reference signs: 1. filtering mechanism, 11. filtering body, 111. accommodating cavity, 112. opening, 12. cover, 121. top cover, 122. side cover, 1221. cavity, 13. supporting member, 14. hook-and-loop fastener, 141. hook tape, 142. loop tape, 15. fastening assembly, 151. connection member, 152. fastening point, 16. conductive body, 2. electroplating material, 3. guide wheel, 4. anode wire, 5. cathode wire, 6. cathode conductive apparatus, 7. power supply, and 8. conductive material.

DESCRIPTION OF EMBODIMENTS

To explain technical content, construction features, and objectives and effects achieved of technical solutions in detail, the following describes in detail with reference to specific embodiments and accompanying drawings.

In the descriptions of this application, unless otherwise specified and defined explicitly, the terms "first" and "second" are merely intended for a purpose of description, and should not be understood as any indication or implication of relative importance; unless otherwise specified and defined explicitly, the term "plurality of" indicates two or more; and the terms "connection" and "fastening" should be understood in their general senses. For example, the "connection" may be a fixed connection, a detachable connection, an integrated connection, or an electrical connection; or may be a direct connection, or an indirect connection through an intermediate medium. Persons of ordinary skill in the art can understand specific meanings of these terms in the embodiments based on specific situations.

In the descriptions of this specification, it should be understood that the positional terms such as "up", "down", "left", and "right" described in the embodiments of this application are described from angles shown in the accompanying drawings, and should not be understood as a limitation on the embodiments of this application. In addition, in the context, it should be further understood that when an element is described as being "above" or "under" another element, that element may not only be directly connected "above" or "under" the another element, but also be indirectly connected "above" or "under" the another element through an intermediate element.

During electroplating, the inventors usually found that a surface of an electroplated conductive material 8 is scratched, and electroplating needs to be stopped for inspection. At first, the inventors thought that the scratch is caused by a guide wheel 3, but after the guide wheel 3 has been improved, the surface of the conductive material 8 is still scratched. After further research, the inventors found that the surface of the conductive material 8 is scratched because a filtering mechanism 1 is eroded in an electrolyte, and the filtering mechanism 1 curls in a direction indicated by an arrow z in the figure to scratch the conductive material 8. In addition, to avoid a problem that the conductive material 8 cannot be used because the conductive material 8 is scratched when the filtering mechanism 1 curls, this application provides a device for producing a conductive material.

Figure 2:
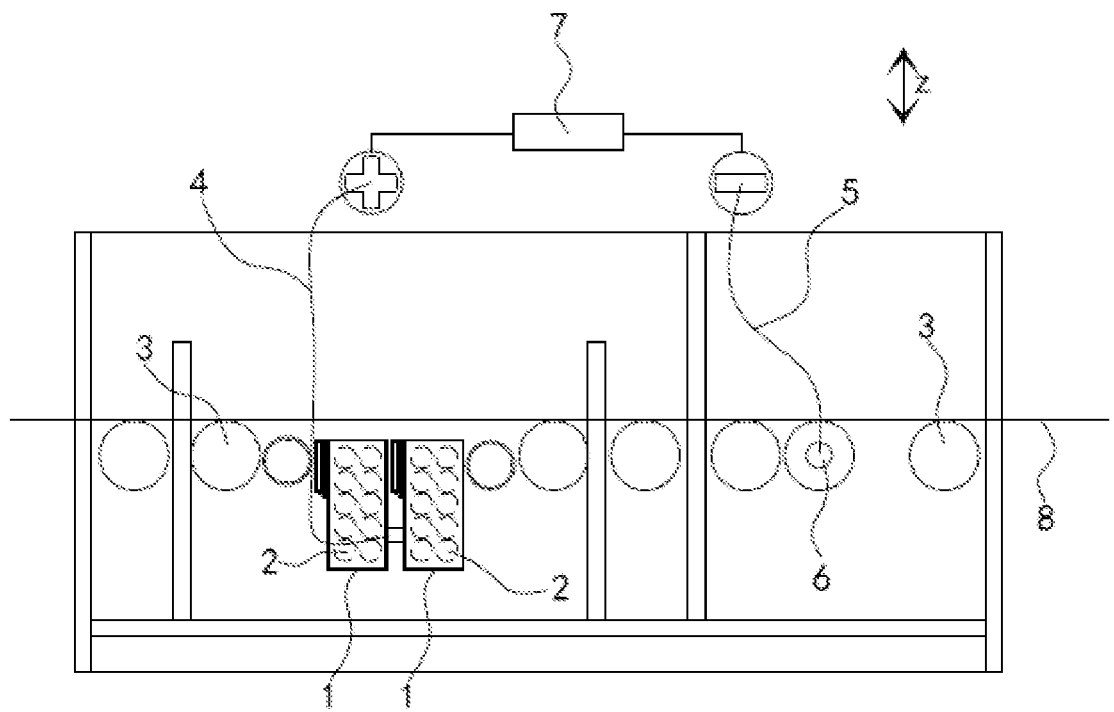
FIG. 2 is another schematic diagram of a device for producing a battery according to a specific embodiment.
Figure 3:
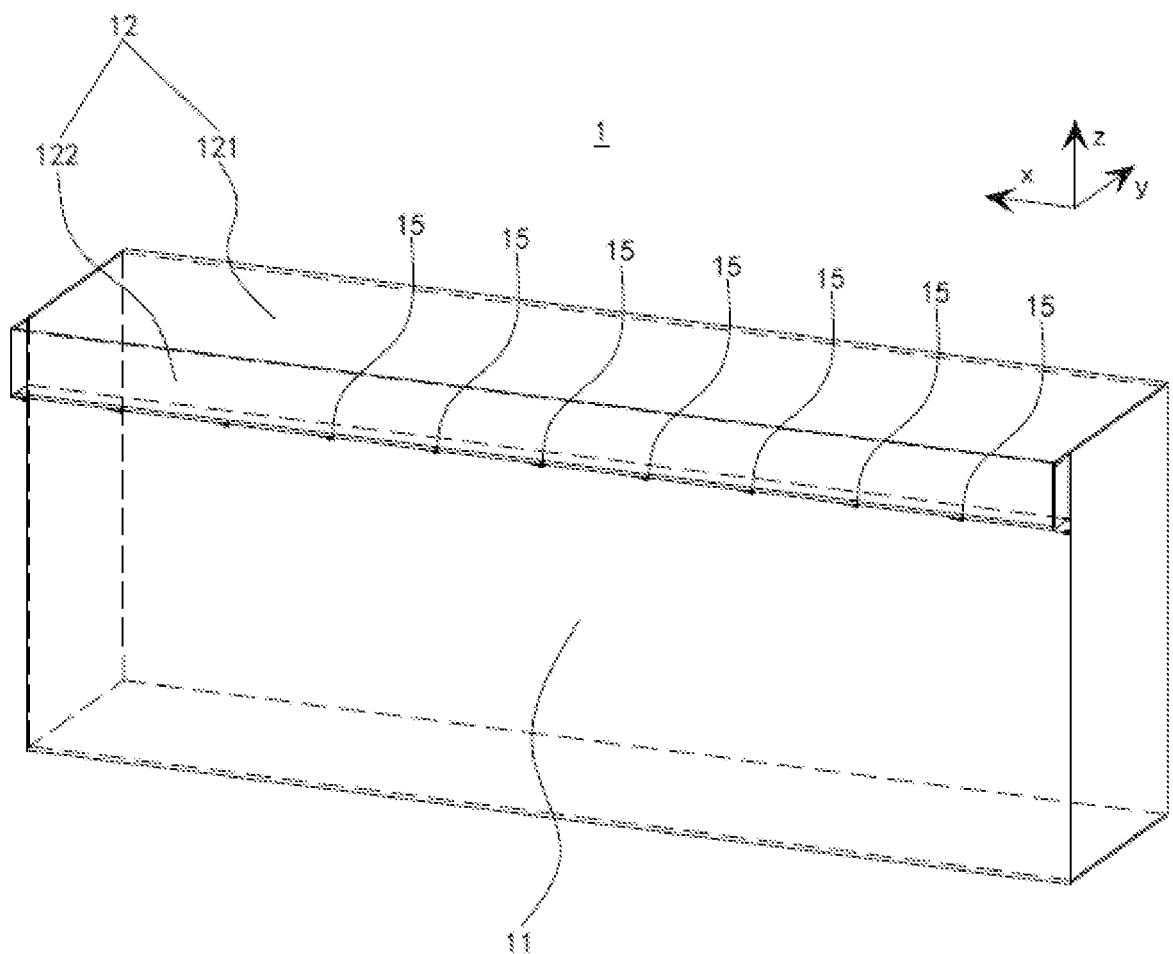
FIG. 3 is a schematic structural diagram of a filtering mechanism according to a specific embodiment.

The device for producing a conductive material provided in this application is described below with specific embodiments. A direction indicated by an arrow x in the figure is a length direction of an opening 112 of a filtering body 11, a direction indicated by an arrow y in the figure is a width direction of the opening 112 of the filtering body 11, and a direction indicated by an arrow z in the figure is a height direction of the filtering body 11. Referring to FIG. 1 and FIG. 2, this embodiment relates to a device for producing a conductive material, and the device includes a filtering mechanism 1, an electroplating material 2, guide wheels 3, an anode wire 4, a cathode wire 5, a cathode conductive apparatus 6, a power supply 7, and a conductive material 8. In this embodiment, the electroplating material 2 is soluble metal, and the soluble metal is attached to the conductive material 8 after electrolysis. As the soluble metal includes impurities, if the impurities enter the electrolyte, quality of electroplating is easily affected. To prevent the impurities in the soluble metal from entering the electrolyte during the electrolysis, in this embodiment, the filtering mechanism 1 fits around the electroplating material 2, so that the filtering mechanism 1 can filter the electroplating material 2 when the electroplating material 2 is electrolyzed to keep, within the filtering mechanism 1, impurities generated during the electrolysis of the electroplating material 2.

In this embodiment, the conductive material 8 passes through an electroplating device by using the guide wheels 3 provided at front and rear ends of the electroplating device, a positive electrode of the power supply 7 is electrically connected to the electroplating material 2 via the anode wire 4, and a negative electrode of the power supply 7 is electrically connected to the cathode conductive apparatus 6 via the cathode wire 5, so as to form a complete loop; and after power-on of the power supply 7, electroplating can be implemented. During electroplating, as long as the guide wheels 3 are driven to rotate, the conductive material 8 can be controlled to move forward. To prevent the guide wheels 3 from scratching the conductive material 8, a roller of the guide wheel 3 is made of a soft material such as rubber or plastic, and a buffer layer may also be provided on the roller of the guide wheel 3 to protect the conductive material 8.

As shown in FIG. 1, both surfaces of the conductive material 8 may be plated simultaneously; or alternatively, as shown in FIG. 2, a single surface of the conductive material 8 may be plated, which both fall within the protection scope of the embodiments.

It should be noted that, in this embodiment, the conductive material 8 is a current collector of a battery, and mainly refers to metal foil such as copper foil or aluminum foil in a lithium-ion battery, or may alternatively refer to a tab generally. Therefore, in this embodiment, the device is mainly an electroplating device for producing a current collector of a battery. However, in other embodiments, the device may also be used to produce another conductive material 8, for example, a conductive material 8 for an electrical product such as a motor, a cable, or an electrical instrument, which also falls within the protection scope of the embodiments. As shown in FIG. 3 to FIG. 6, an embodiment further relates to a filtering mechanism 1. The filtering mechanism 1 includes a filtering body 11, a cover 12, and a supporting member 13. The filtering body 11 includes an accommodating cavity 111 for accommodating an electroplating material and an opening 112 provided on the filtering body 11. The cover 12 is configured to cover the opening 112 and be connected to the filtering body 11 to enclose the electroplating material 2 in the filtering body 11. The supporting member 13 is provided on the cover 12 to enhance connection strength between the cover 12 and the filtering body 11. The supporting member 13 is provided, so that the filtering mechanism 1 can be effectively prevented from curling, improving a production yield rate and production efficiency of the conductive material 8. In this embodiment, the filtering body 11 has a cuboid structure, the corresponding opening 112 of the filtering body 11 has a rectangular structure, and the cover 12 is a rectangular cover 12. In other embodiments, the filtering body 11 may have a cylindrical structure, an inverted cone structure, another irregular structure, or the like, and the corresponding opening 112 of the filtering body 11 has a circular structure or an irregular structure, which all fall within the protection scope of the embodiments.

In this embodiment, the filtering body 11 includes the accommodating cavity 111 for accommodating the electroplating material 2 and the opening 112 provided on the filtering body 11, an end of the cover 12 is connected to the filtering body 11, and the cover 12 covers the opening 112 to enclose the electroplating material 2 in the filtering body 11; and the supporting member 13 is provided on the cover 12, and the cover 12 covers the opening 112 of the filtering body 11 to prevent the cover 12 from curling in the direction indicated by the arrow z in the figure and effectively, effectively preventing the cover 12 from scratching the conductive material, and thereby improving a production yield rate of the conductive material.

Optionally, in this embodiment, the cover 12 includes a top cover 121 and a side cover 122, the top cover 121 is provided on the top of the filtering body 11 to cover the opening 112, the side cover 122 is connected to the top cover 121 and provided on a side of the filtering body 11, and the side cover 122 is provided with the supporting member 13. In addition, the supporting member 13 is provided in the side cover 122; and the side cover 122 can pull the top cover 121 downward in the direction of gravity under an action of gravity of the supporting member 13, thereby preventing the top cover 121 and the side cover 122 from curling in the direction indicated by the arrow z in the figure and scratching the conductive material.

It should be noted that a structure of the cover 12 may be an integrated structure, and the supporting member 13 is provided on the cover 12 to fasten the entire cover 12 onto the filtering body 11. The cover 12 may alternatively be divided into discrete structures, where a first part is provided on the top of the filtering body 11, such as the top cover 121; and a second part is provided on a side of the filtering body 11, such as the side cover 122, and the side cover 122 is connected to the top cover 121. The supporting member 13 may be provided only on the side cover 122 to be connected to the top cover 121 via the side cover 122 to pull the top cover 121 downward in the direction of gravity; or the supporting members 13 may be provided in both the side cover 122 and the top cover 121 to fasten the cover 12 onto the filtering body 11, effectively preventing the cover 12 from curling in the direction indicated by the arrow z in the figure. The foregoing two implementations of the cover 12 all fall within the protection scope of the embodiments.

In this embodiment, the cover 12 has a discrete rectangular structure, a top end of the side cover 122 is hinged with the top cover 121, and the cover 12 has two opposite ends, one end being movably connected to the filtering body 11, and the other end being provided with the supporting member 13. One end of the cover 12 is movably connected to the filtering body 11 to facilitate opening of the cover 12; and the other end of the cover 12 is provided with the supporting member 13 to pull the entire cover 12 downward to effectively prevent the cover 12 from curling.

In this embodiment, the supporting member 13 has a long plate structure, a shape of the supporting member 13 matches the rectangular shape of the side cover 122, and therefore, the supporting member 13 can be provided inside the side cover 122. In other embodiments, the supporting member 13 may have a segmented structure or another long plate structure; and the supporting member 13 may alternatively be directly provided outside the side cover 122, and the side cover 122 may be directly pressed against a side wall of the filtering body 11, which all fall within the protection scope of the embodiments.

Optionally, because the filtering body 11 has a cuboid structure and the opening 112 of the filtering body 11 has a rectangular structure, the supporting member 13 extends in a length direction (a direction indicated by the arrow x in the figure) of the opening 112, and the cover 12 is provided with the supporting member 13 in the length direction (the direction indicated by the arrow x in the figure) of the opening 112. The cover 12 is provided with the supporting member 13 in the length direction (the direction indicated by the arrow x in the figure) of the opening 112 to prevent any part of the cover 12 from curling in the length direction of the opening 112 (the direction indicated by the arrow x in the figure).

In a particular case, even if the supporting member 13 is provided, the cover 12 may still curl. To further enhance connection strength between the cover 12 and the filtering body 11, the filtering mechanism further includes a fastening assembly 15. The cover 12 may be connected to the filtering body 11 via the fastening assembly 15 for double insurance. Even if the cover 12 and the filtering body 11 are partially detached, the fastening assembly 15 may still ensure that the cover 12 cannot curl in the direction indicated by the arrow z in the figure or scratch the conductive material 8. In this embodiment, the filtering mechanism 1 includes more than two fastening assemblies 15, and the more than two fastening assemblies 15 are arranged in the length direction of the opening 112 of the filtering body 11 (the direction indicated by the arrow x in the figure). The connection strength between the cover 12 and the filtering body 11 is further enhanced.

Figure 4:
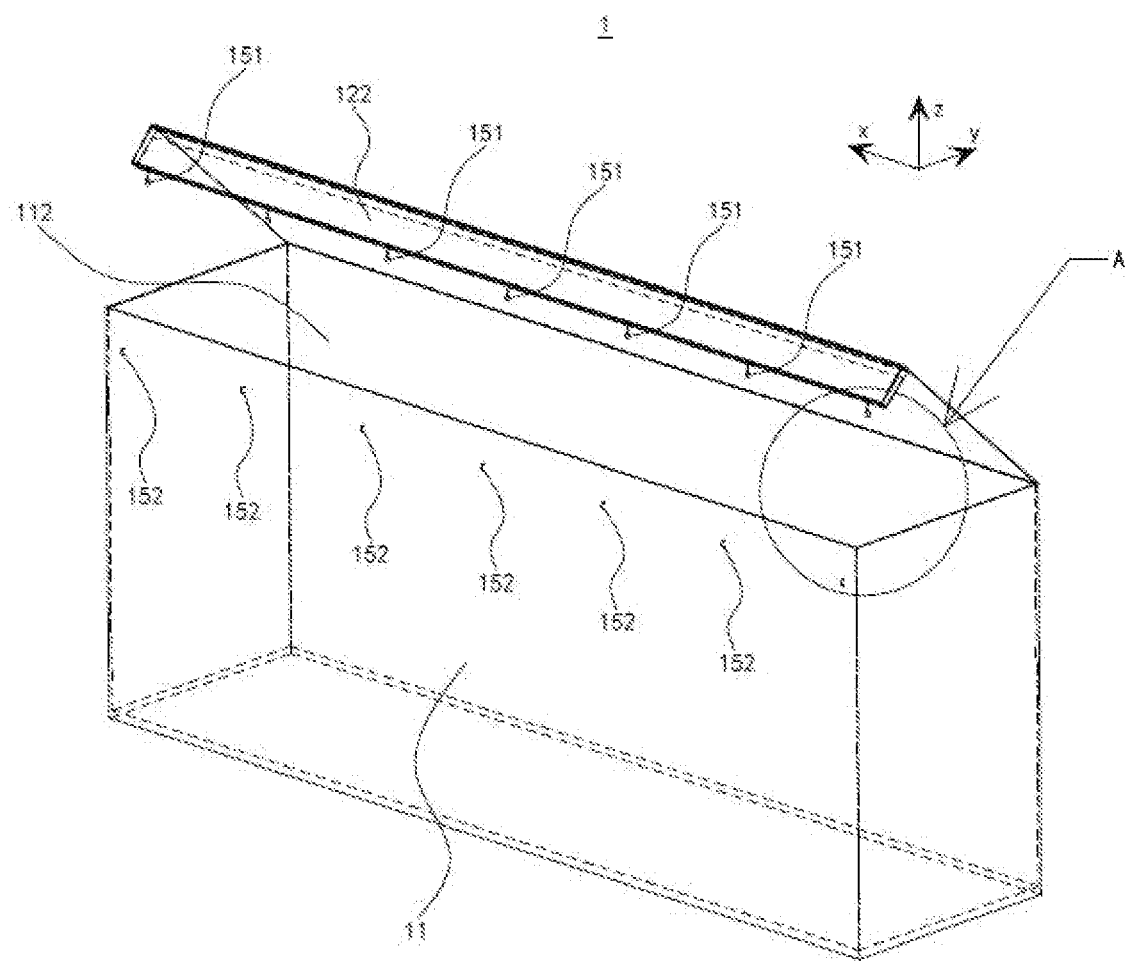
FIG. 4 is a schematic structural diagram of a filtering mechanism in an open state according to a specific embodiment.
Figure 5:
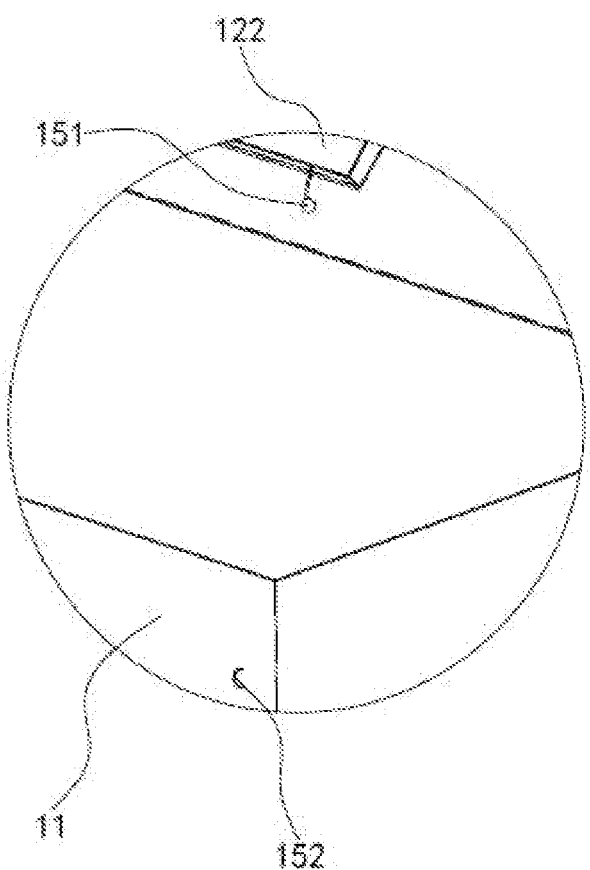
FIG. 5 is a schematic diagram of local enlargement of a location A in FIG. 4.
Figure 6:
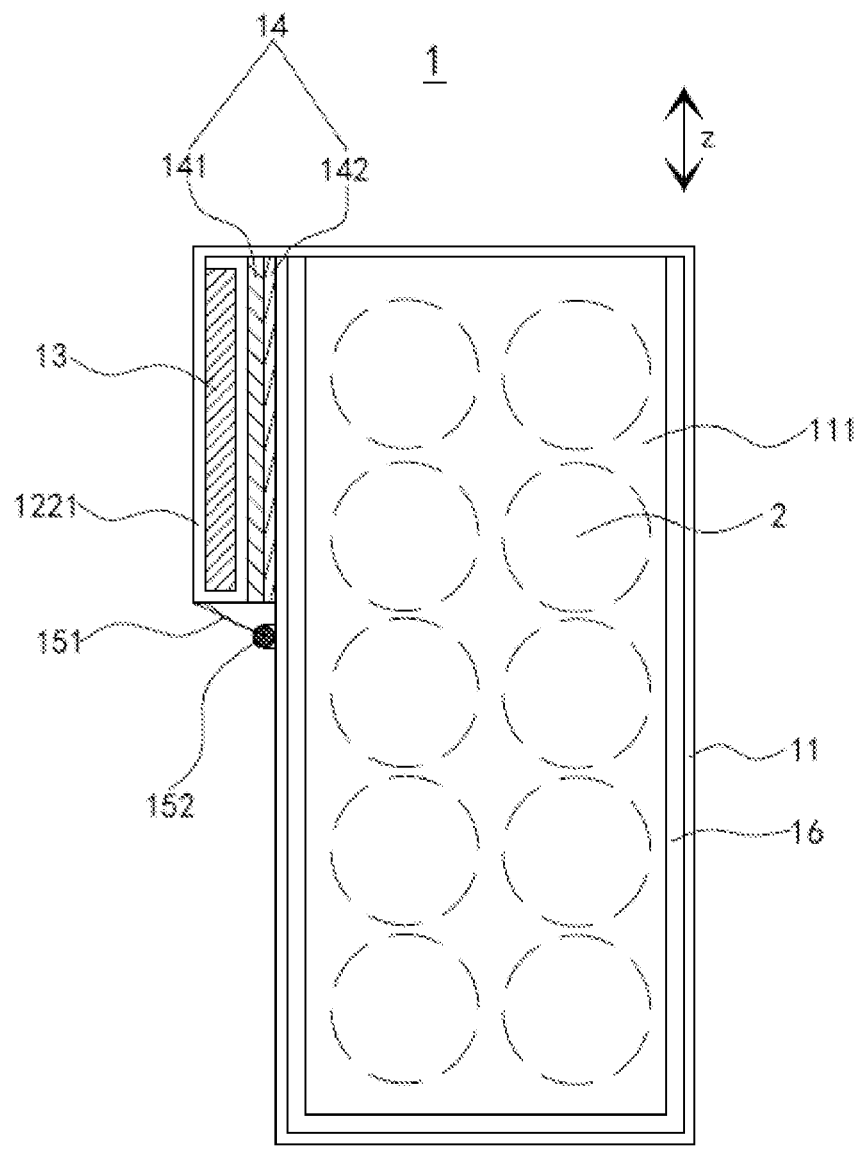
FIG. 6 is a schematic cross-sectional diagram of a filtering mechanism according to a specific embodiment.

As shown in FIG. 4 to FIG. 6, specifically, the fastening assembly 15 in this embodiment includes a connection member 151 and a fastening point 152, where the connection member 151 is provided on the side cover 122, and the fastening point 152 is provided on the filtering body 11, with the connection member 151 and the fastening point 152 detachably connected. In this embodiment, the connection member 151 is provided at the bottom of the side cover 122, the fastening point 152 is correspondingly provided at a relative position of the filtering body 11, and the side cover 122 matches the fastening point 152, so that the side cover 122 is connected to the filtering body 11. A plurality of connection members 151 are provided at the bottom of the side cover 122, and a plurality of fastening points 152 are also provided on a side wall of the filtering body 11.

Optionally, to further enhance connection strength between the cover 12 and the filtering body 11, the cover 12 may alternatively be connected to the filtering body 11 via a hook-and-loop fastener 14. It can be understood that the end of the cover 12 that is provided with the supporting member 13 is connected to the filtering body 11 via the hook-and-loop fastener 14. The cover 12 may be fastened to the filtering body 11 via the hook-and-loop fastener 14. On the basis of the supporting member 13, another fastening structure is added, which can further prevent the cover 12 from curling.

In other embodiments, the cover 12 may be connected to the filtering body 11 in other detachable connection manners, such as non-metallic buckle connection or non-metallic screw connection, which all fall within the protection scope of the embodiments.

As shown in FIG. 6, in this embodiment, the hook-and-loop fastener 14 includes a hook tape 141 and a loop tape 142, and the hook tape 141 matches the loop tape 142, so that the side cover 122 is fastened to the filtering body 11. In this embodiment, the hook tape 141 is provided inside the side cover 122, and the loop tape 142 is provided on an outer surface of the filtering body 11; and in other embodiments, the hook tape 141 is provided on the outer surface of the filtering body 11, and the loop tape 142 is provided inside the side cover 122. The hook tape 141 matches the loop tape 142, so that the cover 12 is fastened to the filtering body 11.

To facilitate disposition of the supporting member 13, a cavity 1221 for accommodating the supporting member 13 is provided in the side cover 122, so that the supporting member 13 can be directly placed in the cavity 1221 to facilitate installation and detachment of the supporting member 13. In other embodiments, the supporting member 13 may be provided outside the side cover 122 to press the side cover 122 toward the filtering body 11, which also falls within the protection scope of the embodiments.

Certainly, in some embodiments, the supporting member 13 may alternatively be provided outside a bonding surface of the hook tape 141 and the loop tape 142 to support the bonding surface of the hook tape 141 and the loop tape 142, so that connection strength between the hook tape 141 and the loop tape 142 is enhanced. The supporting member 13 is provided outside the bonding surface of the hook tape 141 and the loop tape 142, which can improve an overall bonding effect of the hook-and-loop fastener 14, and ensure tight attachment of the hook-and-loop fastener 14, high pasting flatness, and even force on the bonding surface, so that the connection strength between the hook tape 141 and the loop tape 142 is enhanced and the side cover 122 is not likely to curl in the direction indicated by the arrow z in the figure.

In this embodiment, in a process of forming an electroplating layer on the conductive material 8, the electroplating material 2 needs to be energized. During energization of the electroplating material 2, since the electroplating material 2 is soluble metal, the electroplating material 2 is slowly dissolved and a good energization effect cannot be implemented. Therefore, the filtering mechanism 1 in this embodiment of this application may further include a conductive body 16. The conductive body 16 is insoluble metal that is resistant to electricity and corrosion, and the conductive body 16 is specifically titanium, platinum, or the like. When the conductive body 16 is energized, the electroplating material 2 can be indirectly energized. Since the conductive body 16 is insoluble metal that is resistant to electricity and corrosion, compared with a manner of directly energizing the electroplating material 2, even if the electroplating material 2 in this application is slowly dissolved, the conductive body 16 can still have a good conductive effect, which can effectively improve an electrolysis effect and ensure effectiveness of electroplating.

In this embodiment, the conductive body 16 has a cuboid structure, the filtering body 11 and the cover 12 are made of non-woven fabric, and the filtering body 11 and the cover 12 fit around an outer surface of the conductive body 16. In this case, the electroplating material 2 is provided in the conductive body 16, the filtering body 11 and the cover 12 are configured to cover the conductive body 16, and the power supply 7 is configured to energize the conductive body 16. In other embodiments, the conductive body 16 may have a cylindrical structure, an inverted cone structure, another irregular structure, or the like, and the filtering body 11 and the cover 12 may be adjusted along with adjustment of the shape of the conductive body 16, which all fall within the protection scope of the embodiments.

During use, a plurality of electroplating materials 2 are put into the conductive body 16, and the conductive body 16 is fitted around the filtering body 11 and then covered with the cover 12; the hook tape 141 matches the loop tape 142, so that the side cover 122 of the cover 12 is fastened to the filtering body 11; and the side cover 122 is fastened to the filtering body 11 via the fastening assembly 15 to form the filtering mechanism 1. The filtering mechanism 1 is put into an electrolyte, a positive electrode of the power supply 7 is electrically connected to the electroplating material 2 via an anode wire 4, and a negative electrode of the power supply 7 is electrically connected to the cathode conductive apparatus 6 via a cathode wire 5. The power supply 7 is powered on for electroplating of the conductive material 8; and after the electroplating, the filtering mechanism 1 is taken out of the electrolyte, the fastening assembly 15, the hook tape 141, and the loop tape 142 are unfastened, the filtering body 11 and the cover 12 are replaced, and after the electroplating material 2 is put in again, the electroplating can be restarted.

Different from the prior art, in the process of producing the conductive material 8 in this embodiment, the cover 12 of the filtering mechanism 1 can be effectively prevented from curling in the direction indicated by the arrow z in the figure, and the cover 12 can be effectively prevented from scratching the conductive material 8, thereby improving a production yield rate of the conductive material 8.

It should be noted that the foregoing embodiments are described in this specification, but are not intended to limit the patent protection scope of this application. Therefore, based on the innovative concept of this application, changes and modifications made to the embodiments described herein, or equivalent structure or equivalent process transformations made by using the content of this specification and drawings of this application, or direct or indirect application of the foregoing technical solutions to other related technical fields all fall within the patent protection scope of this application.

The invention claimed is:

1. A filtering mechanism configured for producing a conductive material, wherein the filtering mechanism comprises:
   a filtering body, comprising an accommodating cavity for accommodating an electroplating material and an opening provided on the filtering body;
   a cover, configured to cover the opening and connect to the filtering body to enclose the electroplating material in the filtering body; wherein the cover has two opposite ends one end being movably connected to the filtering body, and the other end being provided with a supporting member; wherein the supporting member is provided on the cover to enhance connection strength between the cover and the filtering body;
   wherein the opening is located at the top of the filtering body, and the cover comprises a top cover and a side cover, the top cover being provided at the top of the filtering body to cover the opening, the side cover being connected to the top cover and provided on a side of the filtering body, and the side cover being provided with the supporting member;
   wherein the side cover pulls the top cover downward in the direction of gravity under an action of gravity of the supporting member, thereby preventing the top cover and the side cover from curling;
   wherein the end of the cover that is provided with the supporting member is connected to the filtering body via a hook-and-loop fastener.

2. The filtering mechanism according to claim 1, wherein a cavity for accommodating the supporting member is provided in the side cover.

3. The filtering mechanism according to claim 1, wherein the supporting member extends in a length direction of the opening, and the cover is provided with the supporting member in the length direction of the opening.

4. The filtering mechanism according to claim 1, wherein the hook-and-loop fastener comprises a hook tape and a loop tape, and the supporting member is provided outside a bonding surface of the hook tape and the loop tape to support the bonding surface, so that connection strength between the hook tape and the loop tape is enhanced.

5. The filtering mechanism according to claim 1, wherein the filtering mechanism further comprises a fastening assembly, and the side cover is connected to the filtering body via the fastening assembly.

6. The filtering mechanism according to claim 1, wherein the filtering mechanism further comprises a conductive body, the electroplating material is provided in the conductive body, and the filtering body and the cover are configured to cover the conductive body.

7. A device for producing a conductive material, comprising the filtering mechanism] according to claim 1.

* * * * *